(12) United States Patent
Barker

(10) Patent No.: US 6,942,602 B1
(45) Date of Patent: *Sep. 13, 2005

(54) TREADMILL MOTOR COOLING SYSTEM

(75) Inventor: Paul D. Barker, Woodinville, WA (US)

(73) Assignee: Precor Incorporated, Woodinville, WA (US)

( * ) Notice: Subject to any disclaimer, the term of this patent is extended or adjusted under 35 U.S.C. 154(b) by 269 days.

This patent is subject to a terminal disclaimer.

(21) Appl. No.: 10/293,968

(22) Filed: Nov. 12, 2002

Related U.S. Application Data

(63) Continuation of application No. 09/519,676, filed on Mar. 6, 2000, now Pat. No. 6,478,720.

(51) Int. Cl.[7] .............................................. A63B 22/00
(52) U.S. Cl. ......................................... 482/54; 482/51
(58) Field of Search ................................... 482/51, 54

(56) References Cited

U.S. PATENT DOCUMENTS

| | | |
|---|---|---|
| 3,518,467 A | 6/1970 | Wightman |
| 4,742,257 A | 5/1988 | Carpenter |
| 4,908,538 A | 3/1990 | Geberth, Jr. |
| 5,102,380 A | 4/1992 | Jacobson et al. |
| 5,433,678 A | 7/1995 | Chi |
| 5,563,461 A | 10/1996 | Daniels |
| 5,665,032 A | 9/1997 | Chen |
| 5,763,969 A | 6/1998 | Metheny et al. |
| 5,780,946 A | 7/1998 | Nakamura et al. |
| 5,833,577 A | 11/1998 | Hurt |
| 6,300,694 B1 | 10/2001 | Wang |

*Primary Examiner*—Glenn Richman
(74) *Attorney, Agent, or Firm*—Christensen, O'Connor, Johnson, Kindness

(57) ABSTRACT

A motorized treadmill (10) having an auxiliary cooling fan (34) electronically controlled to provide additional cooling for both the motor (10) and the motor electronic control system (36). The auxiliary fan (34) is located such that the air circulated by the fan will flow over the motor and electronic control system. The auxiliary fan, powered independently of the output shaft of the motor, provides additional cooling to help maintain a constant belt speed while the treadmill is being operated at low speeds.

11 Claims, 4 Drawing Sheets

TREADMILL MOTOR COOLING SYSTEM

This application is a continuation of application Ser. No. 09/519,676, filed Mar. 6, 2000 now U.S. Pat. No. 6,478,720.

FIELD OF THE INVENTION

This invention relates to exercise apparatus, more particularly, to a system for providing additional cooling to a treadmill motor and its electronics.

BACKGROUND OF THE INVENTION

In an effort to generally improve one's health, many people regularly exercise on treadmills by walking, jogging, and running along a traveling surface. There have been many improvements and new developments in treadmills over the years, including motorized treadmills. With motorized treadmills the user may adjust the speed of the treadmill belt to the pace he/she wishes to run or walk. Motorized treadmills, however, require sufficient cooling for the circuitry and motor to operate efficiently. Although motorized exercise treadmills have proven to be useful, the treadmills of the prior art incorporate several inherent disadvantages.

One disadvantage of motorized treadmills is that they require electric motors and control systems that create heat that must be removed in order for the treadmill to operate efficiently. Excessive heat in a motorized treadmill will cause the efficiency of the electric motor to decrease as well as electronic control circuitry to overheat. In order to remove the heat produced by the motor and control circuitry treadmills incorporate a cooling fan that is attached to the motor shaft. The amount of cooling provided by the fan, therefore, is directly proportional to the speed of the treadmill belt. A drawback to this cooling system is that at low treadmill speeds the fan may not provide sufficient cooling.

If the motor becomes too hot, it cannot produce enough current to generate a sufficient amount of torque from the motor to drive the treadmill belt. This occurs because the amount of heat generated in the motor is proportional to the amount of current applied to the motor. At high treadmill belt speeds the cooling of the motor is not a problem because the motor shaft is rotating at sufficient revolutions per minute to sufficiently cool the motor. This cooling allows the motor to increase its torque output by increasing its current.

The problem of overheating is especially evident, for instance, when a heavy person is walking (rather than running) on a treadmill. As the weight of the person on the treadmill increases, the amount of torque required to keep the treadmill belt moving at a constant speed increases. Therefore, since the amount of torque generated by a treadmill motor is generally in proportion to the current applied to the motor, and since also the amount of heat generated in the motor is proportional to the amount of current that can be applied to motor, problems arise at low speeds. At low speeds, the cooling fan does not function as effectively, and therefore less current can be applied to the motor, resulting in less torque output from the motor. At high speeds, however, overheating is typically not a problem because the cooling fan, which is mounted on the motor shaft, rotates sufficiently to cool the motor to move the belt.

Another disadvantage with treadmills is that sufficient cooling is not provided for the electronic control circuitry required for motorized treadmills. This is especially true, if the electronic components are being cooled by a fan located on the motor shaft. Since the amount of cooling available is directly proportional to the motor shaft speed, the electronic circuitry does not get sufficient cooling while the treadmill belt is moving at lower speeds. Electronic circuitry operates at a better efficiency when it is cooler. Additionally, the hotter the circuitry becomes, the hotter the motor will become due to the proximity of the circuitry to the motor. The heating from the circuitry causes the motor to generate even less torque because of this additional heating source.

It would therefore be advantageous to overcome the limitations in the prior art treadmills, it would be desirable to provide a cooling system that would sufficiently cool treadmill motors and electronic components at low speeds such that that the motor may generate more current resulting in higher torque output to move the treadmill belt at constant speeds.

SUMMARY OF THE INVENTION

The present invention provides additional cooling to treadmill motors and motor control circuitry. An auxiliary fan, that is electronically powered, is placed in close proximity to the treadmill motor and electronic control system to provide airflow over these components. The additional cooling allows the treadmill motor to operate more efficiently than if it was hotter. A cooler treadmill motor is able to utilize a higher level of current, which in turn increases the torque output of the motor, thereby allowing a treadmill belt to move at a constant speed, even while the treadmill is being operated at low speeds by the user.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

It will be readily understood that the components of the present invention, as generally described and illustrated in the figures herein, can be arranged and designed in a wide variety of different configurations. Thus, the following more detailed description of the embodiments of the system and method of the present invention, as represented in FIGS. 1–4, is not intended to limit the scope of the invention, as claimed, but is merely representative of the presently preferred embodiments of the invention.

The preferred embodiments of the present invention will be best understood by reference to the drawings, wherein like parts are designated by like numerals throughout.

Figure 1:
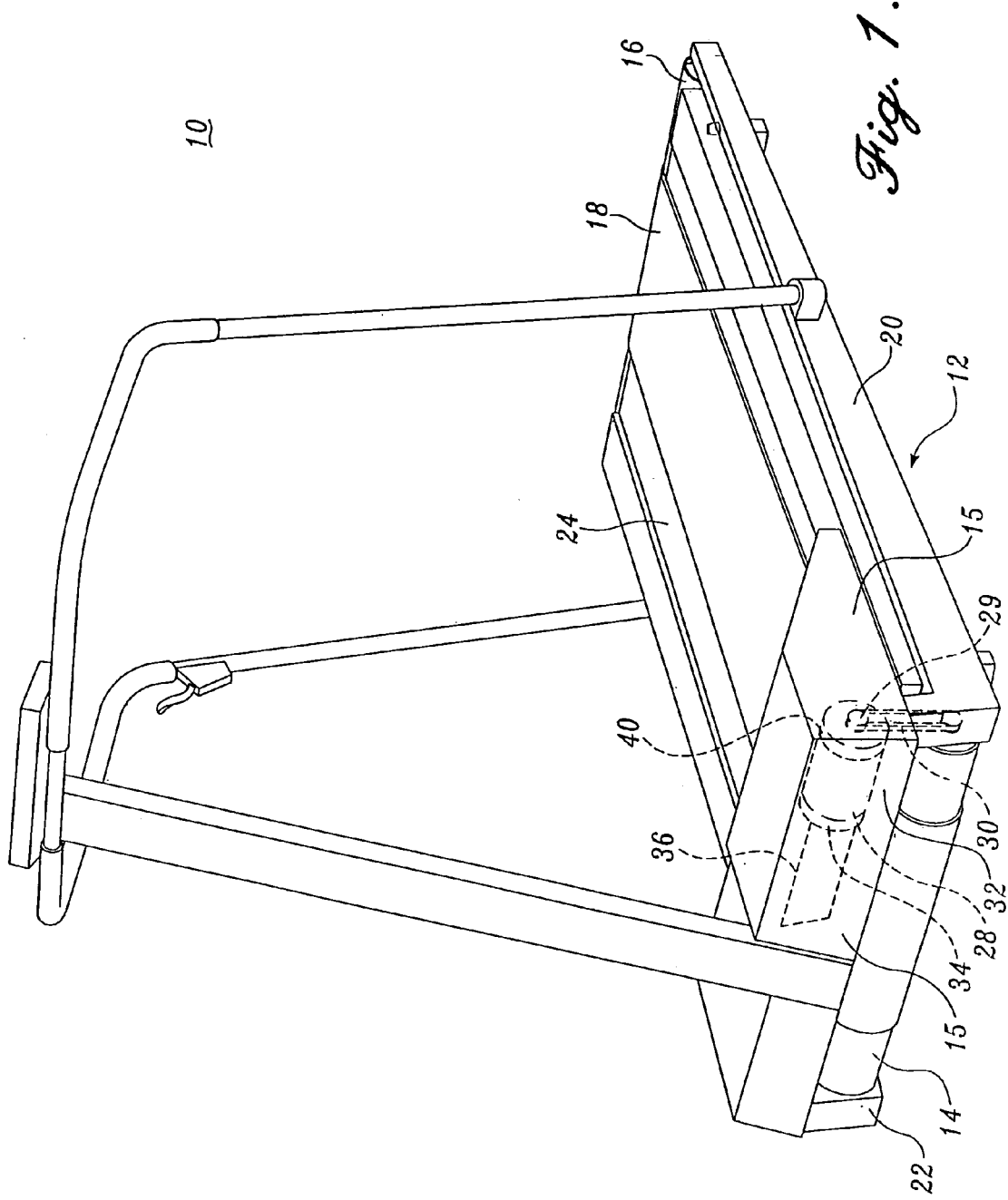
FIG. 1 provides a pictorial view of a treadmill constructed in accordance with the present invention.

A treadmill 10 constructed in accordance with the present invention is shown in FIG. 1. The treadmill 10 includes a frame 12 on opposite ends of which are transversely mounted a forward roller assembly 14 and a rear roller assembly 16. An endless belt 18 is trained about the forward roller assembly 14 and rear roller assembly 16. The treadmill frame 12 includes first and second longitudinal side rail members 20 and 22. The side rail members 20 and 22 are spaced apart and are joined by crossmembers (not shown), as is well-known for treadmill frame construction. A rigid deck 24 spans between and is supported above the first and second frame side rail members 20 and 22.

The upper run of the belt 18 is supported by the rigid deck 24. As used here and throughout, "forward" refers to the direction in which an exerciser faces when using the treadmill. The terms "rear" and "rearward" refer to the opposite direction.

The treadmill 10 further includes a drive motor 28 having a drive shaft 30. A cooling fan 40, coupled to the drive shaft 30, is located between the motor 28 and a drive pulley 31 mounted on the adjacent end of the forward roller assembly 14, as in conventional treadmills. The drive pulley 31 engages a drive belt 32, which engages the driven pulley 33 of the forward roller assembly 14. On the other side of the motor 28, an auxiliary cooling fan 34 is located between the motor 28 and electronic control system 36 to provide additional cooling. The auxiliary cooling fan is positioned such that the fan provides cooling for the motor 28, as well as the electronic control system 36. A cover 15 encloses: the electronic control system 36; the auxiliary fan 34; the motor 28; the cooling fan 40; the drive belt 32; and the drive shaft 30.

Figure 2:
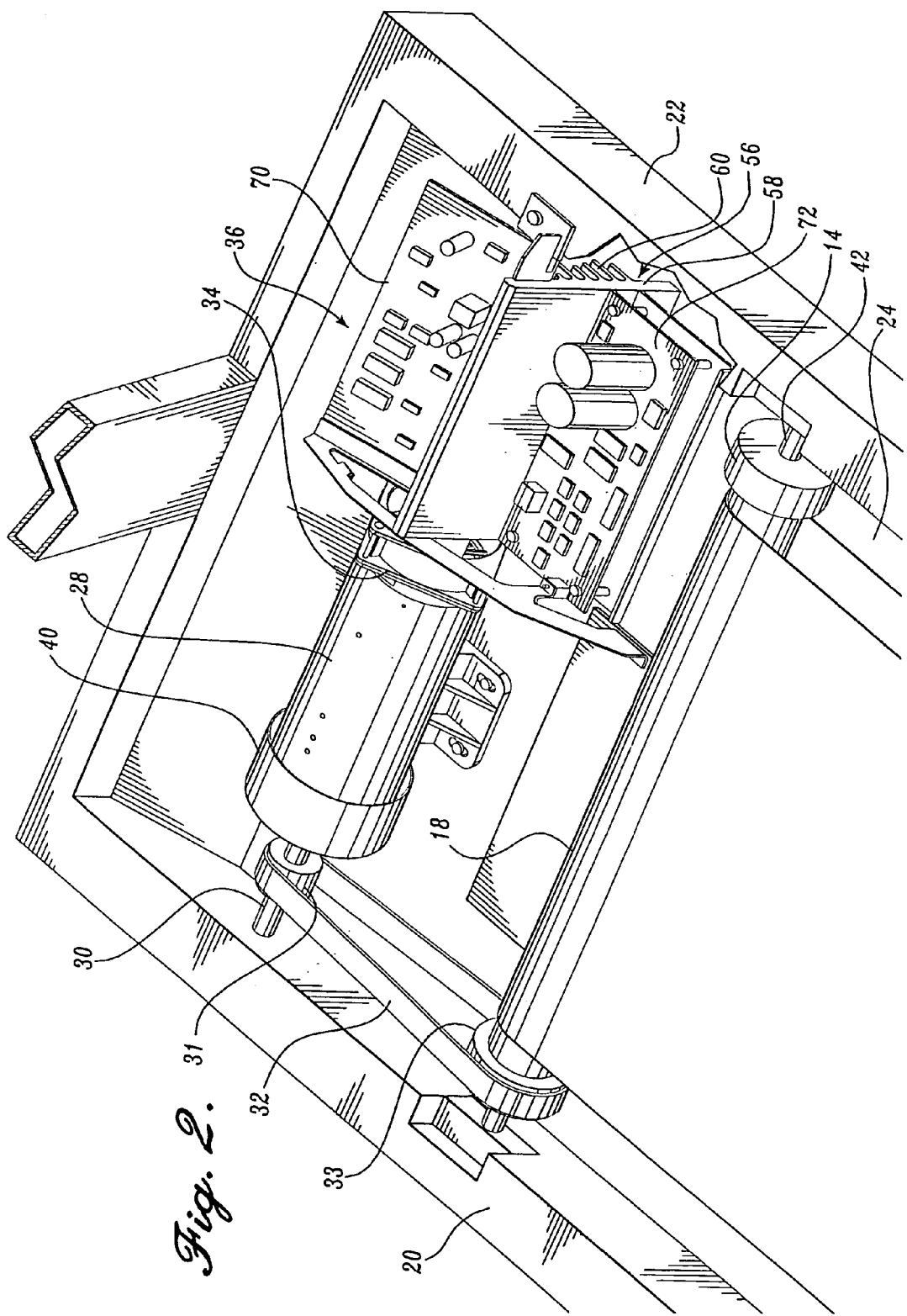
FIG. 2 provides a pictorial view of the forward portion of the treadmill of FIG. 1, with the motor housing and railing removed for clarity.

FIG. 2 displays a pictorial view of the forward section of the treadmill 10 displayed in FIG. 1. The forward roller assembly 14 is rotatably mounted on bearings (not shown) on a front axle 42. The front axle 42 is disposed transversely relative to the longitudinal frame members 20 and 22. An endless belt 18 is trained about the forward roller assembly 14. The upper rung of the belt 18 is supported by the deck 24. The cooling fan 40 is fixably attached to the drive shaft and provides cooling based on the rotation of the drive shaft 30. As the drive shaft 30 increases its rotation rate more cooling is provided by the cooling fan 40. An auxiliary cooling fan 34 is located between the electric motor 28 and the electronic control system 36, which is indicated by the dashed line. The auxiliary cooling fan 34 is capable of providing cooling to both the motor 28 and electronic control system 36 such that the endless belt 18 can maintain a constant speed while the treadmill 10 is being operated at low speeds.

The electronic control system 36 contains a metallic heat sink assembly 56 that includes a generally vertically oriented heat sink wall 58 extending generally longitudinally relative to the rotational axis of the motor 28. As such, air from the auxiliary cooling fan 34 flows over the front and back faces of the heat sink wall 58. A first circuit board 70 is mounted on brackets extending forward from the forward face of the heat sink wall 58 at about forty five degrees relative to the wall 58. A second circuit board 72 is mounted on bracket assembly projecting from the rear face of the heat sink wall 58 at about a ninety degree angle relative to the wall 58. Positioning the circuit boards 70 and 72 relative to wall 58 in this manner, allows the auxiliary cooling fan 34 to provide airflow across the circuit boards 70 and 72, and the heat sink assembly 56. A series of cooling fins 60 extends forwardly from the front face of wall 58. Air from auxiliary fan 34 blowing over these fins helps to transfer heat away from the wall 58.

Figure 3:
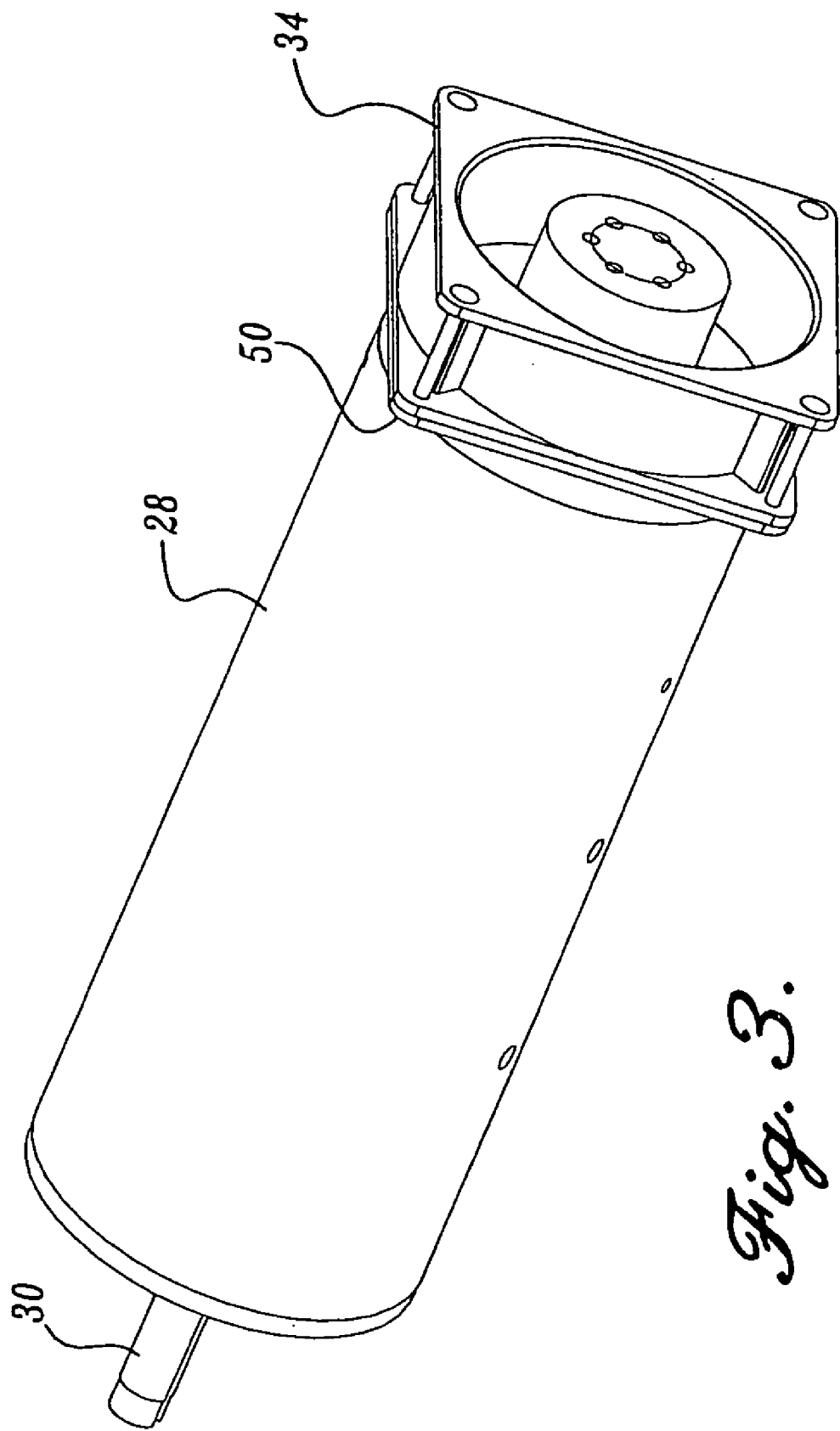
FIG. 3 provides a pictorial of the motor with the fan attached.

FIG. 3 displays one specific embodiment of the present invention. A flat, generally rectangular mounting plate 50 is located at one end of motor 28, that is opposite to the end of the motor from which the drive shaft 30 projects. The mounting plate 50 serves to mount the auxiliary fan 34 to the motor.

The fan used in one embodiment of the invention may be an axial flow fan to draw air longitudinally out through the adjacent end of motor 28 and then blow the air over the electronic control system 36. This auxiliary fan 34 has an independent power source from the motor 28 and its rotational speed is not controlled by the speed of the rotation of the drive shaft 30. Such power source will likely be electric, but could be a hydraulic supply. The auxiliary cooling fan 34 has enough cooling capacity such that while operating the treadmill at low speeds the efficiency of the motor will remain sufficient to maintain the endless belt 18 (shown in FIGS. 1 and 2) at a constant speed. Ideally, the fan is capable of moving (blowing) approximately from 30 to 100 cubic feet of air per minute. One such fan meeting this criteria is a Globe Model No. A47-B15A-15T1-000. This particular fan has a CFM rating of about 50–70. Power required to operate this particular fan is approximately 0.8 watts.

As the temperature of a treadmill motor increases, the efficiency decreases. If the motor 28 becomes too hot it cannot generate a sufficient amount of torque to drive the treadmill belt 18 at a constant rate of speed, especially at low belt speed, such as when the user walks rather than runs on the treadmill. This occurs because the amount of heat generated in the motor is proportional to the amount of current applied to the motor. This auxiliary cooling fan 34 allows the motor to increase its torque output by increasing its current flow due to the lower operating temperature of the motor 28.

Figure 4:
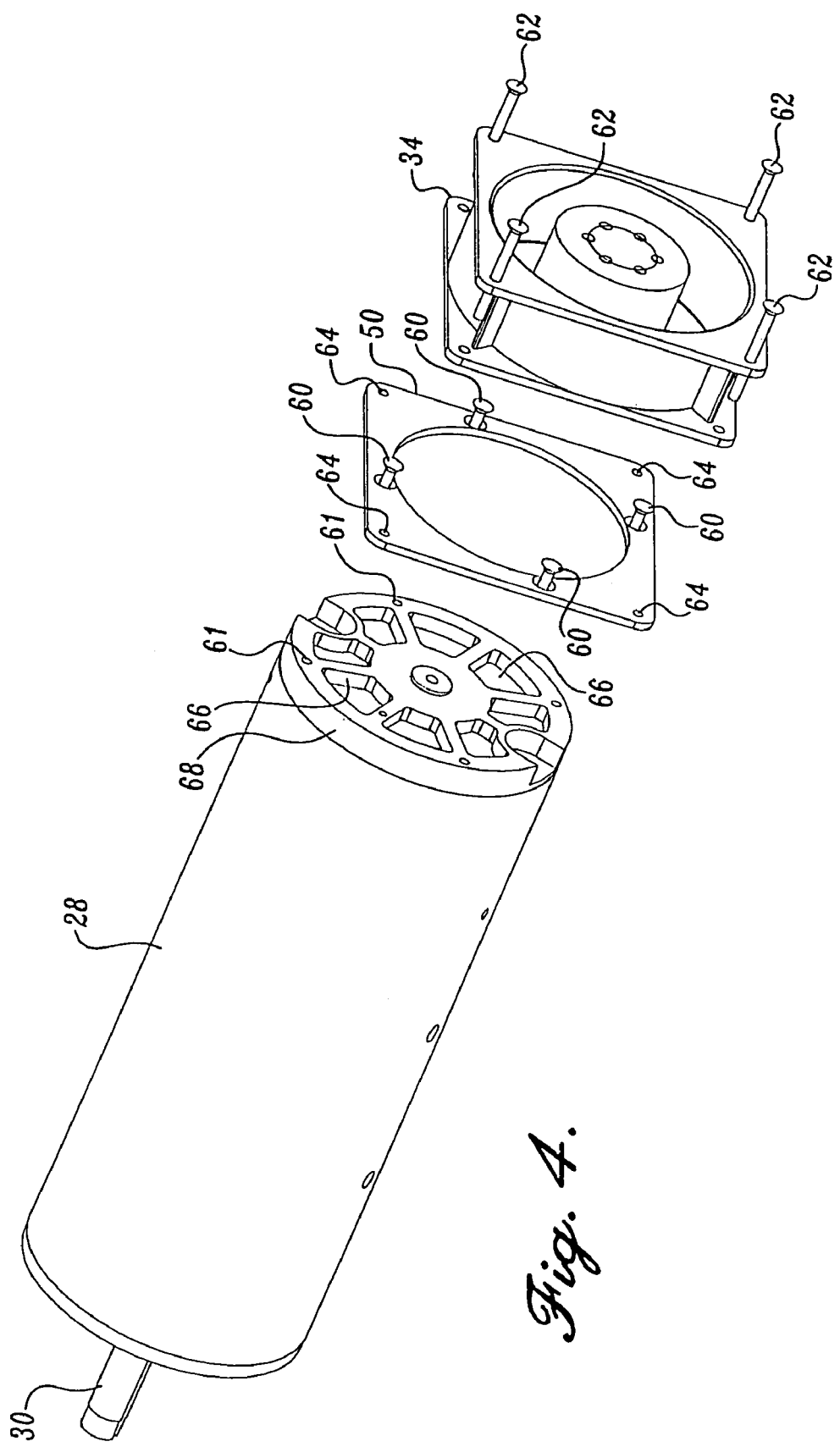
FIG. 4 provides an exploded pictorial view of the motor and fan.

FIG. 4 displays an exploded view of the motor 28, the mounting plate 50, and the auxiliary fan 34. Mounting plate 50 is firmly attached to the motor 28 by hardware members 60 that extend through countersunk clearance holes formed in the mounting plate 50 to engage into threaded holes formed in the end plate of motor 28. The mounting plate 50 contains a large, circular central passageway to enable the auxiliary fan 34 to draw air through the interior of the motor 28. Alternatively the fan 34 may be designed to push air through the interior of the motor 28 and pull air across the electronic control systems.

Preferably, the diameter of the passageway is large enough to ensure that the intake airways 66 of the motor 28 end plate are not obstructed. The mounting plate 50 also contains four threaded holes 64 located adjacent the corners of the plate which are used for attaching the auxiliary fan 34. Four threaded fasteners 62 attach the auxiliary fan 34 to the mounting plate 50. Fasteners 62 are each threaded into screw holes 64.

Although a preferred embodiment of the treadmill motor cooling system has been described above, it should be apparent to those of ordinary skill in the art that various alterations and modifications are possible within the scope of the present invention. For example, the auxiliary fan 34 could be located in various locations, such as above the motor or beneath the motor. Additionally, more than one auxiliary fan could be used to further cool the motor and the circuitry. Also, fans of various types could be used, including axial flow fans as described above, as well as a squirrel-cage type of fan or turbo type of fan.

The embodiments of the invention in which an exclusive property or privilege is claimed are defined as follows:

1. A cooling system for an exercise treadmill having a drive motor to power an end for a belt supported by a treadmill frame, comprising:
   a first fan rotatably coupled to a drive shaft of a drive motor, and
   an auxiliary fan positioned at a location spaced from the first fan, the auxiliary fan driven by a power source independent of a motor drive shaft.

2. The cooling system of claim 1, wherein the auxiliary fan is electrically powered.

3. The cooling system of claim 1, wherein the auxiliary fan is positioned on the opposing side of a motor from a driveshaft.

4. The cooling system of claim 1, wherein the auxiliary fan is selected from a group consisting of an axial flow fan, a squirrel cage fan, and a turbo fan.

5. The cooling system according to claim 4, wherein the axial flow fan has the capacity of approximately 50 to approximately 70 cubic feet of air per minute.

6. A drive system for an exercise treadmill, comprising:
a motor having a power output;
an electronic control system for controlling the operation of the motor;
a first fan coupled to the power output of the motor; and
an auxiliary fan located spaced from the first fan and positioned to provide additional cooling for the motor, the auxiliary fan powered by a source independent of the motor power output.

7. The drive system according to claim 6, wherein the electronic control system further comprising circuit boards on which are mounted electronic control components, and a heat sink assembly on which the circuit boards are mounted, wherein the circuit boards are positioned to be cooled by the auxiliary fan.

8. The drive system according to claim 7, wherein the heat sink assembly includes a metallic heat sink wall, and supports for mounting the circuit boards in heat transmission relationship with the heat sink wall.

9. The drive system according to claim 8, wherein the heat sink wall includes a plurality of fins projecting from the heat sink wall to enhance heat transfer from the heat sink wall during operation of the auxiliary fan.

10. The drive system according to claim 8, wherein the auxiliary fan is positioned between the motor and the heat sink wall.

11. The drive system according to claim 6, wherein the heat sink assembly includes a plurality of fins projecting from the heat sink wall to facilitate heat transfer from the heat sink assembly during operation of the drive system.

* * * * *